Patented Feb. 5, 1946

2,394,064

UNITED STATES PATENT OFFICE 2,394,064

CHEMICAL MANUFACTURE

Willis S. Hutchinson, St. Paul, Minn., assignor to The Mathieson Alkali Works, Inc., New York, N. Y., a corporation of Virginia No Drawing. Application July 12, 1944, Serial No. 544,645

6 Claims. (Cl. 99—192)

This invention relates to the generation of chlorine dioxide and more particularly to an improved method of producing dilute mixtures of chlorine dioxide free from air or other reactive gases.

It has previously been proposed to generate chlorine dioxide by reacting chlorine gas or hydrochloric acid with a chlorite, for instance sodium chlorite.

So as to avoid hazardous concentrations of the chlorine dioxide in the generator and other parts of the apparatus, it has been necessary to dilute the chlorine gas or hydrochloric acid vapor with air or the like by passing the diluent gas through the generator together with the reactant. In this way the chlorine dioxide is, upon formation, diluted with the diluent gas. When air is used as the diluent, the resultant chlorine dioxide mixture will, of course, contain substantial amounts of oxygen and nitrogen and also will contain such other impurities as may have been present in the air.

In most instances the presence of oxygen and nitrogen is not objectionable. However, for some purposes, the presence of oxygen is undesirable.

In accordance with my present invention, chlorine dioxide is generated by reacting carbon dioxide gas, advantageously in a substantially pure state, with an inorganic chlorite, for instance sodium chlorite or calcium chlorite, in the presence of water vapor. Under ordinary conditions, I have found the reaction to be sufficiently slow and incomplete to result in a chlorine dioxide mixture diluted with unreacted carbon dioxide to such an extent as to involve no substantial explosion hazards.

The carbon dioxide gas supplied to the reaction is preferably substantially pure, and, as a source of the gas, solid carbon dioxide, commonly termed "dry ice," is used with advantage. However, carbon dioxide of lesser purity may be used where the requirements of the resultant chlorine dioxide permit.

By my invention, the necessity of using air or other diluent and the metering and handling of corrosive reactants is avoided. The concentration of the resultant chlorine dioxide may be controlled and regulated solely by adjusting the extent of contact between the carbon dioxide and the chlorite. Thus, where a greater concentration of chlorine dioxide in the effluent gaseous mixture is required or is desirable, the extent of contact of the carbon dioxide with the chlorite is increased either by decreasing the rate of carbon dioxide flow through the generator or by increasing the length of the path of the carbon dioxide in contact with the chlorite.

The process is with advantage carried out in a conventional column, such as described in Patent No. 2,309,457, granted on the joint application of Dale K. Mecham and the present applicant, filled to the desired height with chlorite in solid form, such as granular or flaked chlorite. The reaction may be carried out at normal temperatures and pressures. As previously indicated, the rate of flow of carbon dioxide through the column or bed of chlorite and the height of the column or depth of the bed of chlorite are interdependent and may be varied according to the concentration of chlorine dioxide desired.

The reaction between the carbon dioxide and the chlorite is carried out in the presence of water vapor. Advantageously, the water vapor is admixed with the carbon dioxide prior to its passage in contact with the chlorite. This may be accomplished by spraying water into the carbon dioxide gas stream or by bubbling the carbon dioxide gas through a column of water of predetermined height. The amount of water picked up by the carbon dioxide gas may be regulated by adjusting the height of the column of water.

The amount of water vapor present in the carbon dioxide gas passed in contact with the chlorite may be varied over a considerable range. The saturation of the carbon dioxide gas with water is not desirable as there would be a tendency for the water to separate out to an undesirable extent in the reaction zone.

As the rate of reaction varies considerably with the amount of water vapor present in the carbon dioxide gas stream, this fact may also be used with advantage in regulating the rate of reaction and the consequent concentration of chlorine dioxide in the effluent gases. Generally, a satisfactory moisture content may be obtained by rapidly bubbling the carbon dioxide gas through a ½ inch head of water.

For example, I have, by my invention, obtained chlorine dioxide gases of safe concentrations by rapidly bubbling 100% pure carbon dioxide through a ½ inch head of water and passing the resultant carbon dioxide-water vapor mixture, without dilution, through a column of sodium chlorite ½ inch in diameter and 8 inches in depth. In this operation carbon dioxide was supplied at the rate of approximately 0.004 cubic feet per minute. The resultant chlorine dioxide-gas mixture was of a safe concentration, was uncontaminated by chlorine or any gases other than the unreacted carbon dioxide and water vapor and was suitable for use in the bleaching of flour or the like.

An important aspect of the present invention is the use of solid carbon dioxide as the source of the carbon dioxide gas. In the solid form large amounts of carbon dioxide may be transported in small bulk. This is particularly advantageous where the demand for chlorine dioxide is relatively small. A further advantage is the high purity of the carbon dioxide which may readily be obtained from this source. The rate of delivery of carbon dioxide gas to the generating zone may be controlled, to a considerable extent, by controlling the subliming rate of the solid carbon dioxide, as by regulation of temperature or pressure.

The invention finds practical application in refrigeration, especially refrigeration of perishable goods, for instance foodstuffs and the like, subject to deterioration by bacterial and fungus growth and where use of a sterilizing agent is desirable. A dilute mixture of chlorine dioxide is an effective sterilizing agent for such purpose and, where solid carbon dioxide is used as the refrigerant, such dilute mixture of chlorine dioxide may be supplied, in accordance with my present invention, by utilizing the carbon dioxide gas evolved from the refrigerant to react with a chlorite. Thus, the carbon dioxide gas from the solid carbon dioxide may be passed in contact with water so as to pick up the desired amount of water vapor and then passed in contact with the chlorite. The resultant carbon dioxide-chlorine dioxide mixture is then passed to the food compartment and there, by reason of its sterilizing properties, assists in the preservation of the food. The chlorine dioxide mixture thus supplied is free from air or oxygen in any form which might deleteriously affect the food and is diluted solely by the highly-inert carbon dioxide gas and possibly some residual water vapor. By adequate ventilation of the food compartment, a constant supply of dilute chlorine dioxide may be slowly fed to the compartments and the partial pressure of the chlorine dioxide in the mixture is readily maintained within safe though effective limits.

I claim:

1. A process for the generation of chlorine dioxide which comprises reacting carbon dioxide in the presence of water vapor with an inorganic chlorite.

2. A process for the generation of dilute concentrations of chlorine dioxide which comprises reacting carbon dioxide in the presence of water vapor with an inorganic chlorite, and controlling the concentration of the chlorine dioxide formed by regulating the rate at which the carbon dioxide is supplied to the zone of reaction.

3. A process for the generation of chlorine dioxide in a state of dilution with an inert gas which comprises passing a gaseous mixture consisting essentially of carbon dioxide and water vapor in contact with an inorganic chlorite at a rate substantially in excess of that at which the carbon dioxide will react with the chlorite to form chlorine dioxide.

4. A process for the generation of chlorine dioxide in a state of dilution with an inert gas which comprises passing a gaseous mixture consisting essentially of carbon dioxide and water vapor in contact with an inorganic chlorite at a rate substantially in excess of that at which the carbon dioxide will react with the chlorite to form chlorine dioxide and controlling the concentration of chlorine dioxide in the effluent carbon dioxide-chlorine dioxide mixture by regulating the rate at which the carbon dioxide is passed in contact with the chlorite.

5. A process for the generation of dilute concentrations of chlorine dioxide which comprises subliming solid carbon dioxide, and passing the resultant substantially pure carbon dioxide gas in the presence of water vapor in contact with an inorganic chlorite at a rate substantially in excess of that at which the carbon dioxide will react with the chlorite to form chlorine dioxide.

6. In the refrigeration and preservation of perishable foods subject to deterioration by bacterial and fungus growth, in which solid carbon dioxide is used as the refrigerant and chlorine dioxide is used as a preservative, the improvement which comprises reacting gaseous carbon dioxide, resulting from the subliming of the solid carbon dioxide refrigerant, in the presence of water vapor, with an inorganic chlorite to form chlorine dioxide, and passing the generated chlorine dioxide diluted with unreacted carbon dioxide gas into contact with said perishable foods.

WILLIS S. HUTCHINSON.